(12) United States Patent
Feist et al.

(10) Patent No.: US 6,731,329 B1
(45) Date of Patent: May 4, 2004

(54) METHOD AND AN ARRANGEMENT FOR DETERMINING THE SPATIAL COORDINATES OF AT LEAST ONE OBJECT POINT

(75) Inventors: Wieland Feist, Jena (DE); Marcel Seeber, Cologne (DE); Ludwin-Heinz Monz, Ulm (DE)

(73) Assignee: ZSP Geodaetische Systeme GmbH, Jena (DE)

( * ) Notice: Subject to any disclaimer, the term of this patent is extended or adjusted under 35 U.S.C. 154(b) by 0 days.

(21) Appl. No.: 09/570,623

(22) Filed: May 15, 2000

(30) Foreign Application Priority Data

May 14, 1999 (DE) .......................................... 199 22 341

(51) Int. Cl.$^7$ .......................... H04N 7/18; G01C 21/26; G06F 19/00
(52) U.S. Cl. ..................... 348/135; 701/207; 702/104
(58) Field of Search ................... 348/135, 136, 348/94, 95, 172; 702/150, 104, 152, 153; 700/9, 83, 86; 701/207; 356/139.04, 141.1, 141.5; 250/203.2; 342/357.01, 357.06; 33/275 R

(56) References Cited

U.S. PATENT DOCUMENTS

| | | | | |
|---|---|---|---|---|
| 5,784,282 A | * | 7/1998 | Abitbol et al. ............... | 700/186 |
| 6,008,757 A | * | 12/1999 | Boulianne et al. ...... | 342/357.06 |
| 6,031,606 A | * | 2/2000 | Bayer et al. .............. | 356/141.5 |
| 6,460,004 B2 | * | 10/2002 | Greer et al. ................. | 702/104 |

FOREIGN PATENT DOCUMENTS

| DE | 206 831 | 11/1907 |
|---|---|---|
| DE | 36 28 350 | 2/1988 |
| DE | 195 28 465 A1 | 2/1997 |
| DE | 199 22 341 A1 | 11/2000 |
| EP | 0 237 433 | 9/1987 |
| EP | 0 977 011 A1 | 5/1999 |
| JP | 8-327352 | 12/1996 |

OTHER PUBLICATIONS

English Abstract of DE 199 22 341 A1.
English Abstract of DE 195 28 465 A1.
English Abstract of DE 206 831.
English Abstract of EP 0 977 011 A1.
English Abstract of JP 8–327352.
English Abstract of DE 36 28 350.
English Abstract of EP 0 237 433.

* cited by examiner

Primary Examiner—Gims Philippe
(74) Attorney, Agent, or Firm—Reed Smith LLP

(57) ABSTRACT

A method and an arrangement for determining the spatial coordinates of at least one object point $P_i$ from the coordinates of at least two base points which serve as reference points and which do not lie in a plane by means of a video tachymeter which is arranged at a recording stand point, is swivelable about a vertical axis StA and comprises a distance measuring arrangement, a video camera with CCD matrix, a sighting device and angle measuring devices, wherein the video camera is tiltable about a horizontal axis. The coordinates of optional object points are derived from base points in the terrain which are marked and measured by a reflector, laser spot or the like. In addition, a target image containing the marked base points and the object points is recorded and stored. The coordinates of optional object points are then determined from the position data (coordinates) in the target images, which position data are contained in the target images of the marked base points determined by the tachymeter.

13 Claims, 7 Drawing Sheets

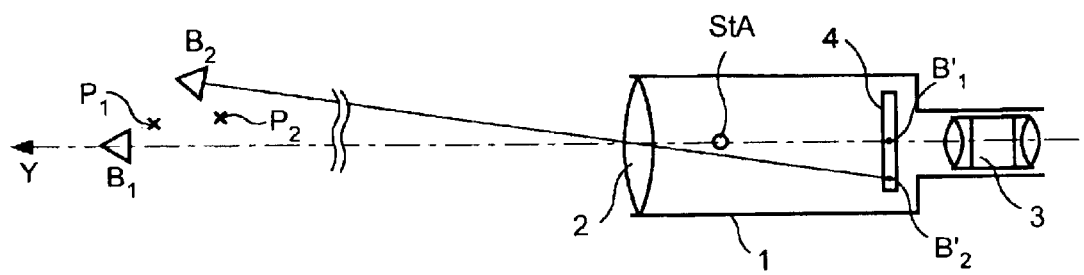
FIG. 1
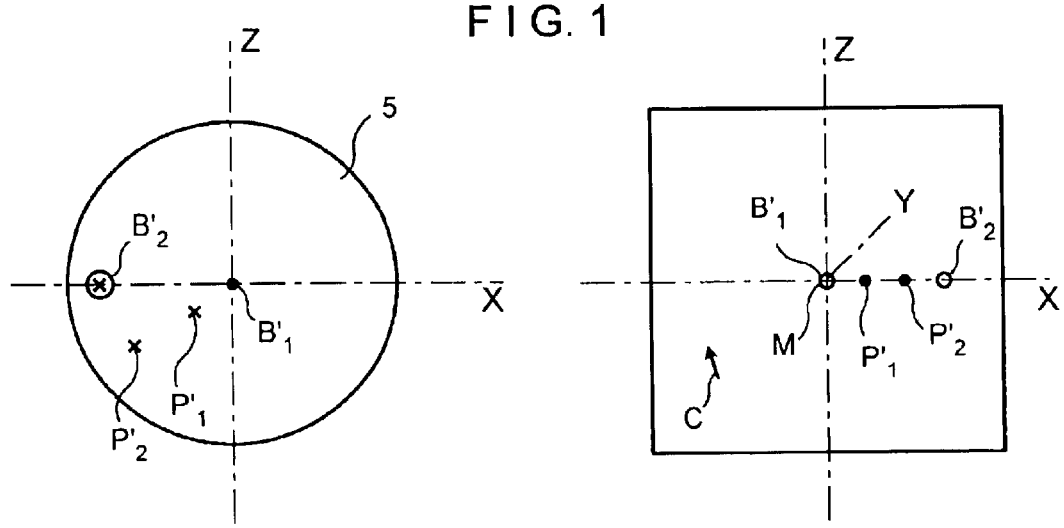
FIG. 2
FIG. 4
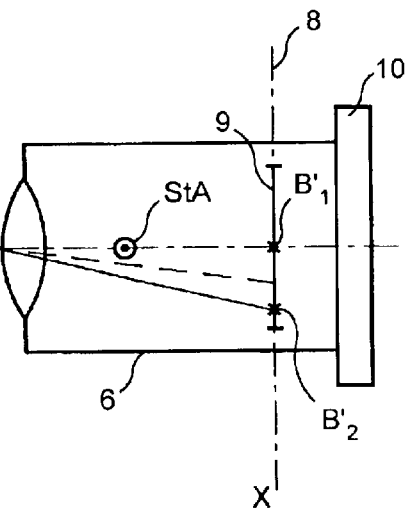
FIG. 3

METHOD AND AN ARRANGEMENT FOR DETERMINING THE SPATIAL COORDINATES OF AT LEAST ONE OBJECT POINT

BACKGROUND OF THE INVENTION a) Field of the Invention

The invention is directed to a method and an arrangement for determining the spatial coordinates of at least one object point through video measurement image tachymetry, preferably for use in geodesy and also in building surveying and object surveying.

b) Description of the Related Art

Modern electronic tachymeters have an arrangement for automatic fine target seeking. In the first step, assuming the presence of image evaluation electronics, they would enable the storage of the target image for supplementing the measurement data of the tachymeter comprising the distance to the target point marked by a reflector, the horizontal angle and the vertical angle. The entire surrounding field of the measurement point can accordingly be fixed in the digital image. This would be the video tachymeter in its simplest form. The precondition for this is that the object field or the object is located, in the horizontal direction, virtually vertical to the optical axis of the video tachymeter and that all objects appear simultaneously sharp in the target image. Likewise, the sighting must be virtually horizontal.

An arrangement of a "video tachymeter" is indicated in DE 36 28 350. In this reference, the reflector is photographed by a video camera arranged on a tachymeter with a point number label to supplement the measurement value of the tachymeter with the added information, that is, the point number. Thus, in this case, additional information is collected which is only used to improve documentation of the terrain points to be measured. Measurements of the terrain points based on the recorded images are not possible with this arrangement.

DE 198 00 336 shows another simple arrangement with an entirely different purpose. In this case, a sensor measuring unit for measuring distances is located on the camera. Data for the orientation of the camera to the object are collected by this arrangement and employed digitally. The measurement values of the camera accordingly maintain an absolute orientation.

WO 97/36147 is likewise directed to the orientation of a video camera to a scene as an object with three selected points whose position is known. Data from the recorded images are used for determining the position of the camera.

DE 196 04 018 is directed to an entirely different object. The arrangement comprises a theodolite with a target pointer and a laser beam distance meter mounted thereon for distance measurement without reflectors. The distance to the surface of the object is measured and the edges of the same are sighted with the telescope, and the angular position of the object is determined. The width of the object can be calculated from the distance and the angle. This reference does not concern a video tachymeter. Measurement values of the object are calculated from the determined measurement data of the theodolite and distance meter by means of a computer. A recording of an image of the object to be measured and determination of measurement data of the object from this image are not carried out.

In EP 0 417 125 B1 (DE 689 04 911 T2), the correlation of three point with surfaces of rooms or spaces is determined with a similar arrangement via these three points by measuring distances and angles. When a plurality of surfaces are measured, lines of intersection and corner points can be determined depending on the quantity of measured surfaces. Here also, no images of the room to be measured are recorded and no measurement data are obtained therefrom.

Arrangements for distance measurement and focusing in photographic cameras do not satisfy the strict requirements for accuracy in geodesy.

In the informational publication "Surveyor™ ALS with Video Option" by the company MDL, a terrain image of an object in the form of terrain is digitally composed from spatially oriented and positioned video pictures by means of a digital video camera and measurement is carried out by means of polar data (distance and angle) which are determined by a normal tachymeter. This digital terrain image has plan information and height information; the latter is determined, and then displayed, in the form of contour lines by means of geometric calculation as is conventional in the making of plans and maps. Dimensional calculations and terrain models can then be derived with the help of these data. Since a distance meter without reflectors is involved, according to this publication, open terrain can be surveyed from an elevated viewing point or stand point without inspection on foot. This is an advantageous application variant of video tachymetry. Unfortunately, it has only very limited accuracy.

To summarize, it can be stated that in the cited prior art:

no measurements are carried out in the video image, there is no combination of the video image data with the data of the tachymeter and/or theodolites such as distances, horizontal angles and vertical angles, no data are derived from these direct measurement data, and no video tachymetry is undertaken.

The object of the EV consists in obtaining and utilizing measurement data from the stored target image for determining additional object points. For this purpose, a plurality of base points marked by reflectors are determined in the video image, wherein distances and angles relative to these base points are measured centrically subsequently in order to determine measurement points between the marked base points from the measurement data of the video image during a subsequent home evaluation of the measurement data and measurement images. At great distances, all images appear sharp almost simultaneously. In order to detect the marked object point in a sharp surrounding area at shorter sighting distances at which the objects extend depthwise, transformation is carried out on this image with maximum contrast proceeding from the images of the base points. In this way, an accurate marking of the desired object point is possible. For this reason, the digital image must have the quality of a measurement image. Because of this possibility, it is possible when recording the terrain to limit to a few critical points which simultaneously form the base points in order to determine additional object points from the video image during the homebase working phase, the positions of these object points being derived computationally from the base points. These object points can be marked during the recording as well as afterwards in the video image by means of a mouse. This possibility saves time when recording in the field and it permits the spatial recording to be supplemented without subsequent footwork or additional field comparison.

OBJECT AND SUMMARY OF THE INVENTION

Accordingly, it is the primary object of the invention to provide a method and an arrangement for video measurement image tachymetry by which measurement data can be obtained from the recorded target image for effectively determining the position of object points and which reduces expenditure on geodetic measurements.

According to the invention, this object is met by a method for determining the spatial coordinates of at least one object point $P_i$ from the coordinates of at least two base points which serve as reference points and which do not lie in a plane by a video tachymeter which is arranged at a recording stand point, is swivelable about a vertical axis StA and comprises a distance measuring arrangement, a video camera with CCD matrix, a sighting device and angle measuring devices, wherein the video camera is tiltable about a horizontal axis. The method includes the steps of marking the base points $B_1$; $B_2$ in the terrain and sighted by the sighting device, measuring their coordinates by the distance measuring arrangement and angle measuring devices, additionally recording a target image $M'_1$; $M'_2$ containing the marked base points $B_1$; $B_2$ and the object points $P_i$ by the video camera and storing the target image and determining the coordinates of the object points $P_i$ from their image point coordinates in the target images $M'_1$; $M'_2$ and from the base points $B_1$; $B_2$ which are marked and determined by tachymetry.

Also in accordance with the invention, an arrangement for determining the spatial coordinates of at least one object point comprises, at the measurement stand point, an electronic tachymeter with an automatic sighting device and a transmitter. The electronic tachymeter is swivelable about a vertical axis (StA). A distance measuring arrangement is included which is tiltable about a tilting axis KA. Also included are a video camera with a CCD matrix, a sighting device and angle measuring devices for measuring horizontal and vertical angle. At the target point, a sighting rod with reflector, a radio device, a receiver, and a graphic field book with storage components are provided. At least a portion of the beam path of the distance measuring arrangement is arranged coaxial to the optical axis of the video camera. A tube is provided for focusing the CCD matrix of the video camera. The tube is controllable depending on the distance measured by the distance measuring arrangement or adjustable manually in direction of the optical axis according to the sharpness or contrast of the video image. An image processing system is provided for detecting object points and their specifying as object points with a determined position.

Accordingly, it is advantageous when the marking of the base points that are determined by tachymetry is carried out in the recorded target images.

In order to facilitate the measurement of object points and to reduce outside field work, the selection of object points $P_i$ to be measured at the target point is advantageously carried out in a target image transmitted to a screen provided at that location or is carried out subsequently during home processing with the aid of recorded and stored target images.

The following method steps are advantageously provided in a method for determining the spatial coordinates of at least one object point $P_i$ from the coordinates of at least two base points which serve as reference points and which are determined by means of a video tachymeter which is arranged at a recording stand point, is swivelable about a standing axis StA, and provided with a receptacle for a distance meter, this receptacle being tiltable about a horizontal tilting axis, with a video camera with CCD matrix, with a sighting device and with angle measuring devices:

sighting of two base points located in the object space through the video tachymeter which is arranged at a recording stand point and is rotatable about a standing axis by a horizontal angle, this video tachymeter having a video camera that is tiltable about the horizontal tilting axis, and determining the oblique distances to the at least two base points by means of the distance measuring arrangement of the video tachymeter, producing two video images containing the at least two base points and storing of the same, wherein the camera is oriented in such a way that the image of the respective sighted base point lies in the respective principal point of the objective of the video camera, the x-, y- and z-coordinates of at least one searched object point located in the space encompassed by the video images and marked during the recording or marked on the recorded video images by means of the target image coordinates measured in the target images for the selected object point that is situated in the object space and imaged on the CCD matrix of the video camera are determined from the oblique distances to the base points, from the measured horizontal angle, from the vertical angles to the base points, from a device constant and from the focal length of the objective, wherein these coordinates x, y, z are coordinates of a coordinate system with axes X; Y; Z with their coordinate origin lying at the intersection of the tilting axis and standing axis of the video tachymeter, and the standing axis extends vertical to the X-Y plane and determines the direction of the Z-axis.

The method is advantageously carried out in the following method steps:

a. Sighting a first base point by adjusting the axis of the video camera at a first horizontal angle and at a first vertical angle relative to the X-Y plane in the direction of the first base point and measuring of the first vertical angle and the first horizontal angle, wherein the vertex of this vertical angle and of the horizontal angle lies in the tilting axis of the video tachymeter; recording and storing a first target image and measuring the oblique distance to this first base point with a distance measuring arrangement arranged coaxial to the axis of the video camera of the video tachymeter, wherein the video camera is oriented in such a way that the image of the first base point lies in the principal point of the objective of the video camera and, further, contains the image of the second base point.

b. Swiveling the video tachymeter about a second horizontal angle formed by the two base points and the standing axis of the video tachymeter, wherein the vertex of this angle is located on the standing axis;

c. Sighting a second base point by adjusting the axis of the video camera at a second horizontal angle and at a second vertical angle relative to the X-Y plane in direction of the second base point and measuring the second vertical angle and second horizontal angle, wherein the vertex of this angle lies in the tilting axis of the tachymeter, recording and storing a second measurement image and measuring the oblique distance to this second base point with the distance meter of the video tachymeter, wherein the video camera is oriented in such a way that the image of the second base point lies in the principal point of the objective of the video camera and, further, contains the image of the first base point.

d. Determining the coordinates of any object points contained in the recorded target images and located in the object space by means of the coordinates of the first and second base point by da. marking the searched object point during recording in the present video image or marking the searched object point in the recorded video images by means of clicking on a mouse;

db. measuring the target image coordinates of the object point in the recorded video images or recordings;

dc. converting the target image coordinates of the object point which are located in the respective plane of the CCD matrix into analog coordinates located in the object space by means of
the measured oblique distances to the two base points, corrected by the device constants,
the measured target image coordinates,
the focal length of the objective of the video camera, dd. calculating parameters of needed support points by means of
image coordinates of the target images converted in the object space
the measured oblique distances to the two base points,
the measured horizontal angle by which the video tachymeter must be swiveled about the standing axis during subsequent sighting of the base points,
the measured above-mentioned vertical angles relative to the base points,
distances which are derived from the horizontal angle, from the above-mentioned oblique distances and from the two vertical angles, de. transforming these support point parameters into the coordinates of the coordinate system X; Y; Z with its origin at the intersection of the standing axis and tilting axis and determining the coordinates of these support points in this coordinate system.

e. Calculating the coordinates x; y; and z of the object point with the coordinate origin of said coordinate system which lies in the intersection of the tilting axis and standing axis of the video tachymeter by means of the coordinates of the said support points by determining the coordinates of the intersection of two straight lines $g_1$ and $g_2$ defined by these support points. The coordinates of this intersection are also the coordinates of the object point to be measured.

To continue a video image traverse started at a first stand point of the tachymeter with a traverse comprising object points proceeding from a second tachymeter stand point, the traverse comprising object points is determined proceeding from the first stand point of the tachymeter and is continued proceeding from the second stand point of the tachymeter.

According to a further realization of the method according to the invention, particularly when the additional object point lies in another focal plane, which can quickly become the case with short sighting distances and the observer must refocus on this plane and clearly mark the desired object point, it is advantageous when an image evaluating device determines the target image coordinates of the desired object point that belong to a desired object point plane, after which focusing is carried out in the target image planes of the object points by means of an autofocusing device. The image evaluating device for detecting object points and their specifying as object point with a determined position is carried out by means of a transformation of known target image planes to a plane of this kind with maximum contrast.

An arrangement for determining the spatial coordinates of at least one object point comprises, at the measurement stand point, an electronic tachymeter with an automatic sighting device and with a transmitter and, at the target point, a sighting rod with reflector, receiver and the graphic field book with storage components. The electronic tachymeter or video tachymeter is swivelable about a vertical axis and comprises a distance meter which is tiltable about a tilting axis and a video camera with a CCD matrix. The video tachymeter further comprises a sighting device and angle measuring devices for measuring horizontal and vertical angles. In this connection, it is advantageous when at least a portion of the beam path of the distance measuring arrangement is arranged coaxial to the optical axis of the video camera, when a focusing arrangement is provided for focusing the CCD matrix of the video camera, this focusing arrangement being controllable depending on the distance measured by the distance measuring arrangement or adjustable manually according to the sharpness of the video image, and when an image processing system is provided for detecting object points and their specifying as object point with a determined position.

The CCD matrix of the video camera is advantageously arranged in a tube which is displaceable in a controllable manner in direction of the optical axis for purposes of focusing, its displacement being realizable by a drive unit which is controlled by computer according to an algorithm.

Accordingly, it is further advantageous that the respective displacement path of the CCD matrix is calculated by the computer corresponding to the distances from the respective sighted base point that are determined by the distance measuring arrangement.

It is further advantageous when an image evaluating device controls an autofocusing system in such a way that the focusing position of the CCD matrix pertaining to a selected object plane measures target image coordinates of the desired object point $P_i$, wherein the base point $B_1$ and $B_2$ whose images $B'_1$ and $B'_2$ lie in the target image planes $M'_1$ and $M'_2$ must be sighted. The displacement path can also be derived in this case during the focusing of the CCD matrix from the object point plane located between the target image planes of the base points by an image transformation toward the maximum.

The sighting rod located at the target point comprises a signal receiver or data receiver and a computer with a target image screen, so that all operations can be carried out at the target point in the same way as at the stand point.

The method includes progressive measurement point marking in the target images at the target point, control of the measuring process and the methods of determining the selected object points from the measurement data of the tachymeter and its camera. The determination of the positions of the object points in all three coordinates form two measurement points is only possible according to the invention in that additional support points are derived from the tachymeter data and video image data, so that intersecting straight lines can be formed therefrom, the intersections of these straight lines representing the selected object points with their coordinates. The tachymeter reference points can also be marked by a laser pointer and the distances can be measured without reflectors. The horizontal angle and vertical angle are indicated in a known manner with the sighting. The marked reference or base points are highlighted by the laser light in the video image. The correlation of the images is given by the indicated angles.

The invention will be described in more detail in the following with reference to an embodiment example.

BRIEF DESCRIPTION OF THE DRAWINGS

In the drawings:

FIG. 1 shows the position of base points and object points relative to a visual telescope in a simplified view;

FIG. 2 shows the viewing field of the visual telescope;

FIG. 3 shows the position of the base points and object points relative to a CCD camera with an image screen in a simplified view;

FIG. 4 shows the image on the screen of the CCD camera;

DESCRIPTION OF THE PREFERRED EMBODIMENTS

Figure 5:
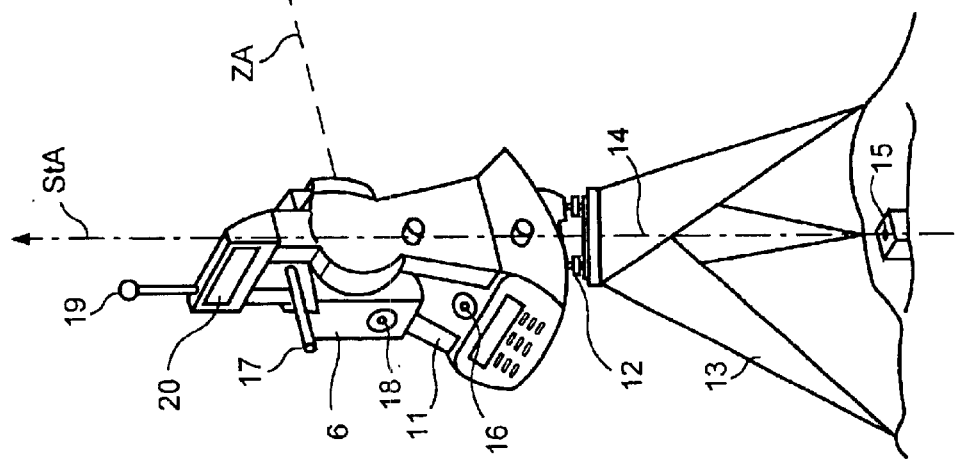
FIG. 5 shows an arrangement, according to the invention, for determining the spatial coordinates of object points.

For the sake of simplicity, FIG. 1 shows a visual telescope 1 of a tachymeter with an objective 2 and an eyepiece 3. Located at a distance from the telescope 1, e.g., in the terrain, are the base points $B_1$ and $B_2$, whose coordinates x; y; z are known. $P_1$ and $P_2$ designate object points whose coordinates are to be determined by the method according to the invention by means of base points $B_1$ and $B_2$. The telescope 1 is swivelable about an axis StA, so that the base points $B_1$ and $B_2$ can be sighted one after the other. These base points and object points are imaged in a known manner in the eyepiece focal plane 4 of the telescope 1.

FIG. 2 shows the field of view 5 visible in the eyepiece focal plane 4 of the visual telescope 1 with the position of the images of the base points $B'_1$ and $B'_2$ and the images of the object points $P'_1$ and $P'_2$. The coordinate axes are designated by X; Y; Z.

FIG. 3 shows a video camera 6 with an objective 7; a CCD matrix 9 which is composed of CCD elements and on which the terrain is imaged with base points and object points is arranged in the focal plane 8 of the objective 7. The image field imaged on the CCD matrix 9 with the images of the base points and object points $B'_1$; $B'_2$; $P'_1$ and $P'_2$ are made visible to the observer on a screen 10 of the video camera 6.

FIG. 4 shows on the screen 10 of the video camera 6 the position of the images $B'_1$; $B'_2$; $P'_1$ and $P'_2$ of the imaged base points $B_1$ and $B_2$ and object points $P_1$ and $P_2$. The coordinate axes are again designated by X; Y; Z. For the sake of simplicity and a clearer illustration of relationships, the base points and object points again lie in the X-Y plane as was the case in FIG. 2. The video camera 6 is swivelable about an axis StA so as to be able to direct it to the base points $B_1$ and $B_2$ one after the other. In this case, the observer can sight the base point $B_1$ with the center M of the apparent cross lines and can mark them with the cursor C in order to determine the position of, e.g., the object point $P_1$ computationally even when the position of base point $B_2$ is known.

FIG. 5 shows an arrangement for determining the spatial coordinates of object points which comprises, at the measurement stand point, an electronic or video tachymeter 11 with tripod 12 on a stand 13, wherein the tachymeter 11 is centered with its axis (standing axis) StA according to the vertical sighting target axis 14 above a ground point 15. The video tachymeter 11 is leveled by tripod screws of the tripod 12 according to a circular level 16 and has the video camera 6 with a coarse sight 17. For purposes of sighting a target point, the video camera 6 can simultaneously be tilted about a tilting axis with a button 18 located at the telescope and the entire tachymeter 11 can be rotated about the axis StA. The video tachymeter is further provided with a transmitter with an antenna 19 and a sighting device. As will be seen from FIG. 5, a display 20 on which the target point is visible is located at the upper part of the tachymeter 11. Moreover, the image center is marked on the display 20 by means of cross lines. The observer can carry out an exact sighting adjustment by means of the horizontal fine drive unit and the vertical fine drive unit of the tachymeter 11.

A sighting rod 21 is arranged at the target point over a ground point 22; a circular level 23 for vertical alignment of the sighting rod 21 and a reflector carrier 24 which carries the tiltable reflector 25 are arranged at the sighting rod 21. Also arranged at the sighting rod are a battery 26, a video display 27, an operator's control unit 28 with its own image screen and a radio device 29 (FIG. 5a) with antenna 30. In order to align to the video tachymeter 11 located at the measurement stand point, the observer sets the sighting rod 21 in the center of the ground point 22, manually aligns the rod vertically according to the circular level 23, then rotates the sighting rod 21 and tilts the reflector 25 until the video tachymeter 11 has been sighted at the measurement stand point. The tachymeter 11 can accordingly also sight the reflector 25 at the sighting rod 21 with its target axis ZA. The radio transmission path carries out the image and data transmission between the measurement stand point and the target point on command. The observer can let the above-mentioned object points be marked and computationally determined by means of a joystick with a cursor, not shown, in the target image appearing on the video display 27 when he has determined beforehand the base points needed for this determination, as was shown in FIGS. 4 and 5.

Figure 5A:
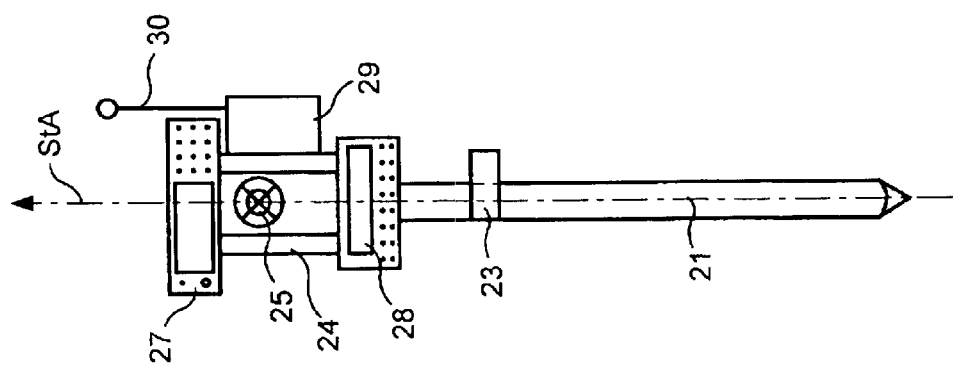
FIG. 5a shows a sighting rod at the target point in a front view.

FIG. 5a shows a front view of the sighting rod 21 mentioned in FIG. 5 along with the units arranged on the sighting rod 21; the same reference numbers are used for the same parts as those in FIG. 5.

Figure 6:
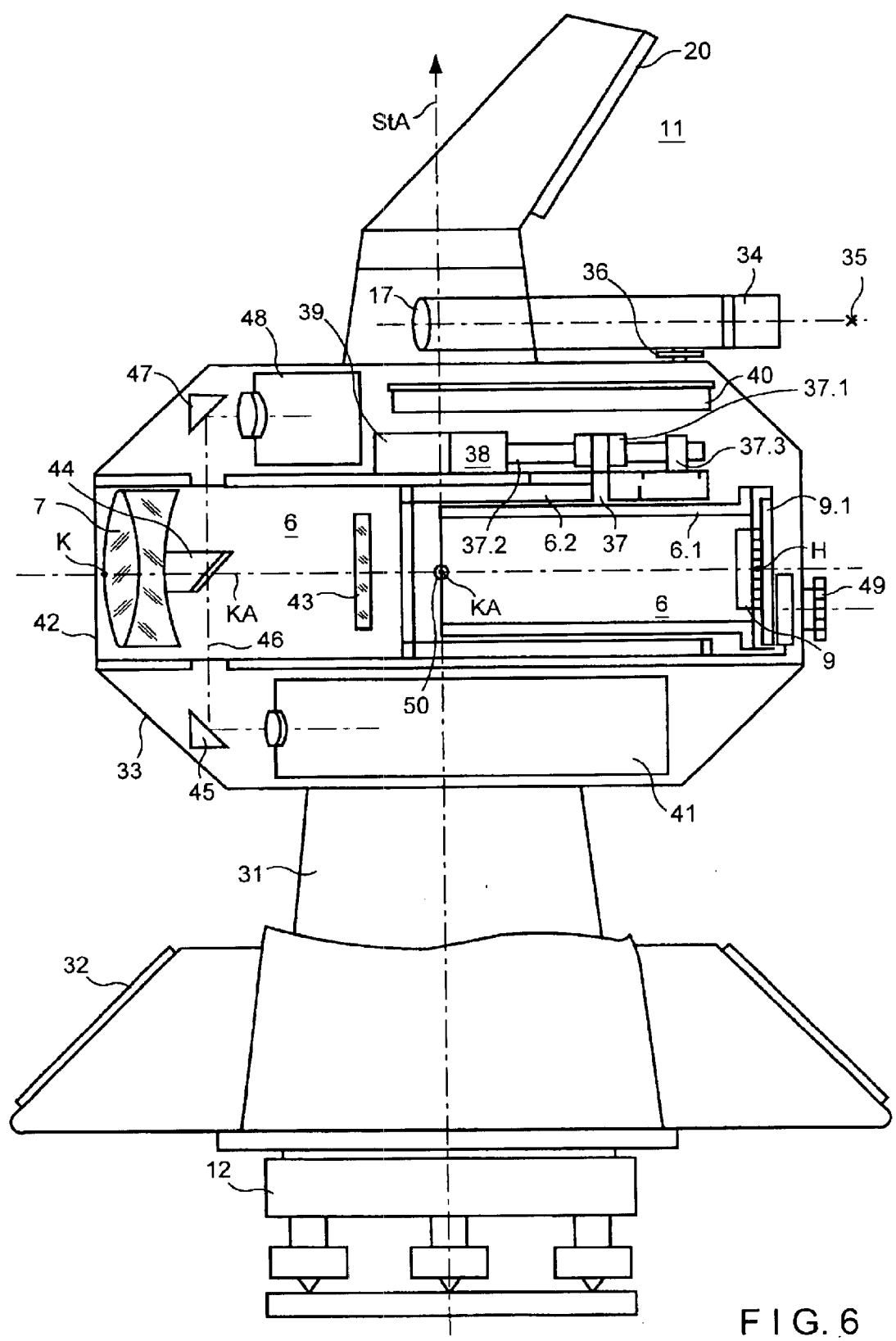
FIG. 6 shows a simplified view of a video tachymeter.

FIG. 6 shows an overview of the construction of the video tachymeter 11. The tripod 12 carries the support 31 with a control panel 32, a camera body 33 of the video camera 6 and the display 20. A coarse sight 17 with an eyepiece 34 with an exit pupil 35 situated far to the outside and a vertical adjusting device 36 are located on the camera body 33. The camera body 33 carries the video camera 6 comprising the objective 7 with the front nodal point K and the CCD matrix 9 in the focal plane, the latter being fastened to a carrier printed circuit board 9.1 and arranged centric to the tube 6.1 of the camera 6. For focusing purposes, this tube 6.1 is supported in a cylindrical sleeve 6.2 with slight adaptive play. It is controlled via a driver 37, whose nut 37.1 is supported concentrically on a threaded spindle 37.2, by means of a gear unit 38 of the motor 39 according to an algorithm of a computer.

This computer is advantageously located on a printed circuit board 40 and is not shown in FIG. 6. The threaded spindle 37.2 is supported in the bearing 37.3 and communicates with the gear unit 38. The computer calculates the displacement path of the CCD matrix 9 by a program, known in general, according to the distances from the respective sighted base point B located in the terrain which are determined by the distance meter 41 of the video tachymeter 11.

The axis of the distance meter 41 extends concentric to the axis KA of the video camera 6 which is formed by the front nodal point K and principal point H in the center of the CCD matrix 9. This axis lies in the center of the beam bundle of the distance meter 41, wherein the beam bundle is composed in a known manner of two half-bundles, namely, a transmitter bundle and a receiver bundle.

This axis runs from the nodal point K of the objective 7 which is arranged in the objective mount 42 to a selective mirror 43. The receiver bundle passes through the objective, is reflected at the selective mirror 43 and guided via deflecting prisms 44 and 45 and via an intermediate image plane 46 into the distance meter 41.

A visible transmitter bundle which is emitted by a laser 48 via a prism 47 is projected via the objective 7 into space via the inner reflection surface of the prism 44 which is arranged centric to the objective 7. It serves as a beam bundle arranged centrically with respect to the camera axis KA for purposes such as marking physical objects or for beaming from reflectors in the terrain which, e.g., can show object points to be measured. These object points P which are marked in this way are pointed to the CCD matrix 9 as measurement points.

Further, a handle 49 for tilting the video camera 6 about the axis KA and for rotating the entire tachymeter 11 manually about the axis StA is located at the video tachymeter 11. A coarse focusing of the video camera 6 and, accordingly, a focusing of the image on the display 20 is likewise carried out with the handle 49. As with any tachymeter, the tilting axis KA and the standing axis StA of the video camera 6, which is also the optical axis of the camera, also intersect in this case at an intersection point. The component groups and the mechanical and electronic function units included in any electronic or video tachymeter, such as angle measuring devices and tilt sensors, adjusting elements for sighting, power supply, device control and data storage, are not shown They belong to the prior art.

In the method for determining the spatial coordinates of at least one object point $P_i$ from the x-, y- and z-coordinates of at least two base points $B_i$ serving as reference points and not lying in a plane by means of a distance measuring arrangement which is arranged at a recording stand point, is swivelable about the vertical standing axis StA and is constructed as a distance meter 41, a video camera 6 with CCD matrix 9, a video tachymeter 11 comprising a sighting device and angle measuring devices, wherein the video camera 6 is tiltable about a horizontal axis, a tilting axis KA, the coordinates x; y; z of selectable object points $P_i$ are derived from base points $B_i$ in the terrain which are marked and measured by a reflector, laser spot or the like. In addition, a target image containing the marked base points $B_i$ and the object points $P_i$ is recorded and stored. The coordinates of optional object points $P_i$ are then determined from the position data (coordinates) in the target images, which position data are contained in the target images of the marked base points $B_i$ determined by the tachymeter. The marking of the base points $P_i$ that are determined by the tachymeter is carried out in the recorded target images, for example, by clicking on a mouse or in some other suitable way.

The selection of object points $P_i$ to be measured can also be carried out at the target point in a target image transmitted to an image screen or video display 27 (FIG. 5) which is provided at the target point or can be carried out later during indoor processing.

Figure 7:
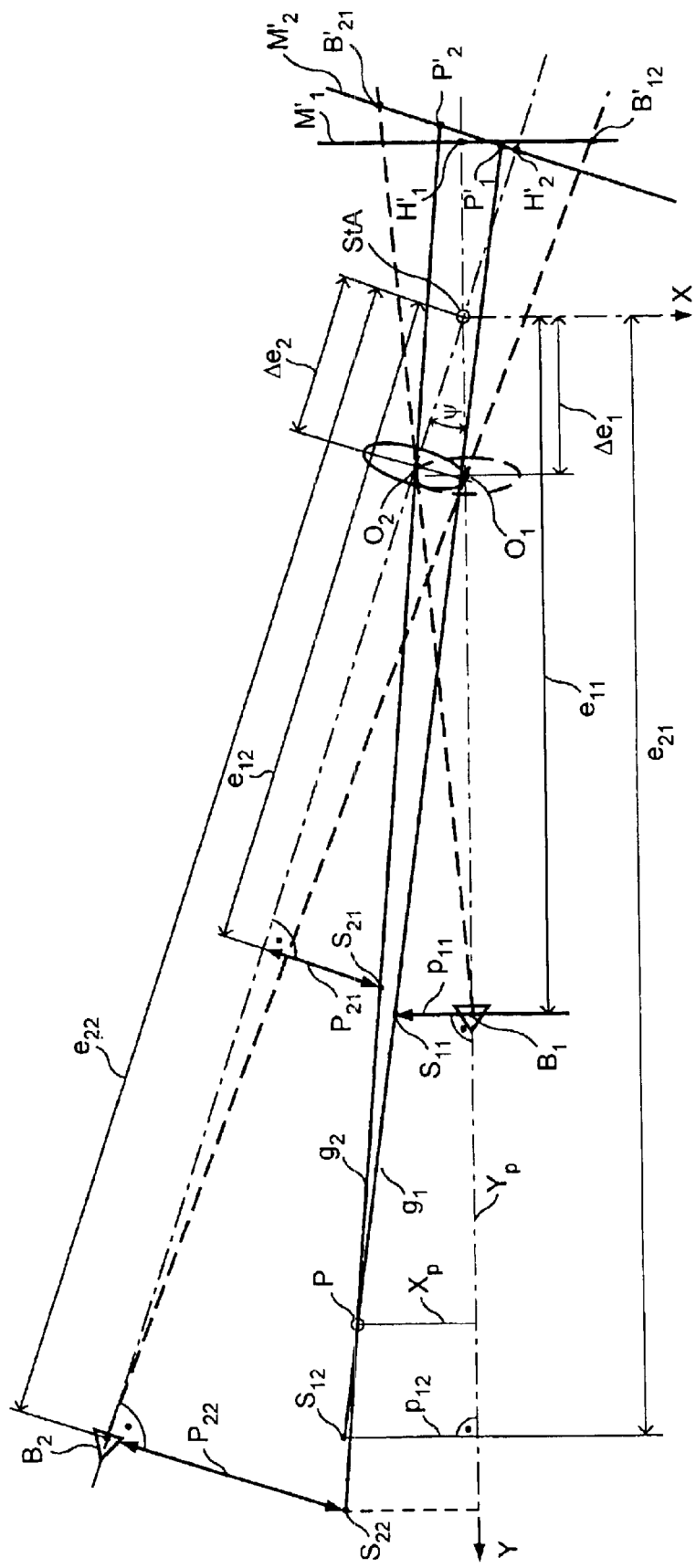
FIG. 7 shows the geometric relationships in the sighting of two base points and determination of the x and y coordinates of an object point in the X-Y plane.

The determination of the x- and y-coordinates of an object point P by means of two base points $B_1$ and $B_2$ is shown schematically in FIG. 7, wherein all of these points lie in the horizontal X-Y plane. The video tachymeter 11 whose objective O is shown in FIG. 7 in two positions $O_1$ and $O_2$ adjusted successively is located at a recording stand point which is designated by StA in FIG. 7 as the point where the standing axis of the video tachymeter intersects the X-Y plane and at the same time represents the zero point OP of the coordinate system with the coordinate axes X and Y. The horizontal distance $e_{11}$ to a sighted base point $B_1$ whose image $B'_1$ lies in the principal point $H'_1$ on plane $M_1$ of the CCD matrix of the video camera is measured by the distance meter, not shown, of the video tachymeter whose measurement axis extends in a first position coaxial to the axis $O_1 B'_1$ of the video camera.

In a manner analogous to that described with reference to base point $B_1$, base point $B_2$ is subsequently sighted by swiveling the CCD camera about the axis StA in such a way that the camera axis $O_1 B'_2$ is directed to the base point $B_2$ and the target image plane is focused in a corresponding manner and in such a way that a sharp image is provided. The image $B'_2$ of the base point $B_2$ appears in the plane $M'_2$ of the CCD matrix. At the same time, the horizontal angle $\psi$ is measured by the horizontal circle of the video tachymeter and the horizontal distance $e_{22}$ to the base point $B_2$ is measured by the distance meter of the video tachymeter. The target images $M'_1$ and $M'_2$ obtained in this manner relative to the two base points $B_1$ and $B_2$ are stored.

Naturally, when sighting the base points $B_1$ and $B_2$, it must be ensured that the object point P or, when there are a plurality of object points, object points $P_i$, is imaged on these target images $M'_1$ and $M'_2$.

The coordinates of an object point $P_i$ in the X-Y plane are determined with the two base points $B_1$ and $B_2$ in the following manner (FIG. 7):

The searched object point P can either be marked on the screen during recording in the available video image, followed immediately by the measurement of the image coordinates $p'_{11}$ and $p'_{12}$ of the image points $P'_{11}$ and $P'_{12}$ in plane $M'_1$ and $M'_2$ of the CCD matrix 9, because, by reason of its structure, the object point P which is marked and detected in one image is also marked and measured in the preceding image by the image detection algorithm, or the images are used later on the screen and marked by clicking on a mouse in the overlaid video of the searched object point P and the coordinates are calculated by computer, wherein the coordinate calculation is carried out by means of the computer according to the following formulas, wherein the quantities indicated in the formulas are shown in FIG. 7.

Accordingly, the sagitta $p_{11}, p_{12}, p_{21}$ and $p_{22}$ in the object space are calculated according to similarity sets from the measured horizontal distances $e_{11}$ and $e_{22}$, the measured horizontal angles $\psi$, constants $\Delta e_1 = \Delta e_2 = \Delta e$, and image coordinates $p'_{11}$ and $p'_{12}$ of the image points $P'_{11}$ and $P'_{12}$ in plane $M'_1$ or $M'_2$ of the CCD matrix 9, wherein the constant $\Delta E$ of the distance of the standing axis StA from the principal point $O = O_1 = O_2$ of the objective and $O_1$ and $O_2$ are the different positions of the objective of the video camera. For this purpose, auxiliary distances $e_{12} = e_{11} \cdot \cos \psi$ and $e_{21} = e_{22} \cdot \cos \psi$ are derived from the measurement values determined for the horizontal distances $e_{11}$ and $e_{22}$ and the horizontal angle $\psi$. In connection with the statements made in the following with reference to FIG. 8, the term "oblique distance" is used for quantities $e_{11}$ and $e_{22}$ for purposes of distinguishing them, because a sighting of points located in space is carried out in this case.

The right-angle coordinates of four support points $S_{11}$, $S_{12}$, $S_{21}$ and $S_{22}$ are determined in the coordinate system of the video tachymeter 11 with reference to the first base point OP from the horizontal distances $e_{11}$ and $e_{22}$, said auxiliary distances $e_{12}$ and $e_{21}$, the measured horizontal angle $\psi$ and the calculated sagitta $p_{11}$, $p_{12}$, $p_{21}$ and $p_{22}$. Support points $S_{11}$ and $S_{12}$ define a straight line $g_1$ and support points $S_{21}$ and $S_{22}$ define a straight line $g_2$. The calculation of these straight lines $g_1$ and $g_2$ is carried out according to known mathematical formulas. The intersection of these two straight lines $g_1$ and $g_2$ is the searched object point P with its coordinates x and y in the coordinate system of the video tachymeter 11, whose origin lies in the standing axis StA at point OP.

The sagitta $p_{11}$, $p_{12}$, $p_{21}$ and $p_{22}$ and the coordinates of the support points $S_{11}$, $S_{12}$, $S_{21}$ and $S_{22}$ are calculated according to the following formulas, where f is the focal length of the objective:

$$\text{sagitta } p_{11} - p'_{11}/f(e_{11} - \Delta e)$$

$$p_{12} - p'_{11}/f(e_{22} \cos \psi - \Delta e)$$

$$p_{22} - p'_{12}/f(e_{22} - \Delta e)$$

$$p_{21} - p'_{12}/f(e_{11} \cos \psi - \Delta e).$$

coordinates of the support points:

| | |
|---|---|
| $S_{11}: x = P_{11}$, | $y = e_{11}$ |
| $S_{12}: x = P_{12}$, | $y = e_{22} \cos \psi$ |
| $S_{22}: x = e_{22} \sin \psi - P_{12} \cos \psi$, | $y = e_{22} \cos \psi + P_{22} \sin \psi$ |
| $S_{21}: x = e_{11} \sin \psi \cos \psi - p_{21} \cos \psi$, | $y = e_{11} \cos^2 \psi + p_{21} \sin \psi$. |

For high accuracy in the determination of the coordinates of the searched object point P, it is advantageous when the base points $B_1$ and $B_2$ lie as far apart as possible. The object point P and object point $P_i$ should not lie too close to or behind the base points $B_1$ and $B_2$. However, the object points can lie in the intermediate space in front of or behind the base points $B_1$ and $B_2$ without cause for concern.

The geometric relationships in the sighting of two base points $B_1$ and $B_2$ and the determination of the coordinates x and y of at least one object point P in the X-Y plane at short sighting distances will be described with reference to FIG. 8. In this regard, sighting distances of up to approximately 100 m are assumed.

If the base points $B_1$ and $B_2$ and the at least one object point P at short sighting distances are located at varying distances from the standing axis of the video tachymeter, the individual points for each distance must be focused on; this applies to the base points $B_1$ and $B_2$ as well as for the object points whose coordinates are to be determined.

In this connection, the two base points $B_1$ and $B_2$ are measured first and the distances $e_{11}$ and $e_{22}$ and angles $\alpha_{B1}$ and $\alpha_{B2}$ lying in the horizontal plane are determined. If object point P (FIG. 8) is to be measured, base point $B_1$ is first sighted and brought into focus and, during this sighting, P is refocused in the target plane $M_{P1}$ and the image P' of the object point P is marked in the image so that the image coordinate $p'_1$ can be measured in the image in plane $M_{P1}$.

The second base point $B_2$ is then sighted and focused in the image plane. Refocusing is then carried out on the target plane $M_{P2}$ proceeding from P. The object point P is still marked in this plane and has the same image distance $b_{P2} = b_{P1}$ as in the method step indicated in the preceding paragraph, which is simultaneously measured by the automatic focusing device. Further, the image coordinate $p'_2$ is measured in the sighting plane $M_{P2}$. The sagitta $p_{11}$; $p_{12}$; $p_{21}$ and $p_{22}$ are then calculated from these image coordinates $p'_1$ and $p'_2$ and focal length $b_{P1}$ according to the equations indicated above in connection with the description of FIG. 7, wherein the focal length f is replaced in the equations by the image distance $b_{P2} = b_{P1}$ because the image distances no longer lie in the focal plane as is the case with large sighting distances, but rather in the image distance $b_{P1}$. Here again, $S_{11}$; $S_{12}$; $S_{21}$; and $S_{22}$ are also support points which determine straight lines $g_1$ and $g_2$ whose intersection coordinates are the coordinates of the object point P. The same algorithm as that used for determining the coordinates of object points lying at large sighting distances (at infinity in optical terms) is applied for determining the coordinates of object point P.

The method shown in patent claims 4 and 5 for determining the spatial coordinates X; Y; and Z of an object point P by means of at least two base points $B_1$ and $B_2$ serving as reference points with reference to the tachymeter stand point (standing axis StA) will be explained and described more fully with reference to FIG. 9 and using the same reference numbers for the individual component groups and component elements that were used in FIG. 6. In this connection, the coordinates of the base points $B_1$ and $B_2$ located in the object point planes $M_1$ and $M_2$ are first determined by means of a video tachymeter 11 (FIG. 6) which is arranged at a recording stand point OP, is swivelable about a vertical standing axis StA is provided with a receptacle for a distance meter 41, which receptacle is tiltable about a horizontal tilting axis KA, and has a video camera 6 with CCD matrix 9, a sighting device and angle measuring devices (not shown).

The following method steps are now carried out in sequence in time for determining the coordinates of the object point P to be measured:

In a first step, the following are carried out one after: the two base points $B_1$ and $B_2$ located in the object space are sighted by the video tachymeter 11 (FIG. 6) which is arranged at the recording stand point OP and which is rotatable about the standing axis StA by a horizontal angle $\psi$ and which has a video camera 6 which is tiltable about the horizontal tilting axis KA at vertical angles $\zeta_1$ and $\zeta_2$, the oblique distances $e_{11}$ and $e_{22}$ to the at least two base points $B_1$ and $B_2$ are determined by means of the distance meter 41 of the video tachymeter 11, and two video images containing the at least two base points $B_1$ and $B_2$ are made and stored, wherein the camera 6 is oriented in such a way that the images $B'_1$ and $B'_2$ of the respective sighted base points $B_1$ and $B_2$ lie on the optical axis in the respective principal point $H'_1$ and $H'_2$ on the CCD matrix 9. The two positions of the objective of the video camera during the sighting of the two base points $B_1$ and $B_2$ are characterized by $O_1$ and $O_2$.

The coordinates x, y and z of at least one searched object point $P_i$ (P) which is located in the space comprehended by the video images or on the CCD matrix 9 and which is selected and marked during recording or on the recorded video images are now determined from the oblique distances $e_{11}$ and $e_{22}$, the measured horizontal angle $\psi$ in the horizontal plane between the base points $B_1$ and $B_2$, the vertical angles $\zeta_{B1}$ and $\zeta_{B2}$ of the horizontal plane to the base points $B_1$ and $B_2$, the device constants $\Delta e$ and the focal length f of the objective of the video camera 6 by means of the target image coordinates $q'_{i1}$; $q'_{i2}$; $h'_{i1}$; $h'_{i2}$ of the selected object point P ($P_i$) imaged on the CCD matrix 9 and located in the object space, which target image coordinates $q'_{i1}$; $q'_{i2}$; $h'_{i1}$; $h'_{i2}$ are measured in the target images $M'_1$ and $M'_2$. These coordinates x, y and z are coordinates of a coordinate system with axes X; Y; Z with their coordinate origin OP lying at the intersection of the tilting axis KA and the standing axis StA of the video tachymeter 11, and the standing axis StA extends vertical to the X-Y plane and determines the direction of the Z-axis, where i=1; 2; . . . , and n is a natural number with reference to the respective associated object point.

The detail relates to the method steps which will now be explained more fully:

First, the first base point $B_1$ is sighted in the manner described in connection with FIG. 7, a first target image $M'_1$ is recorded and stored and the oblique distance $e_{11}$ to this first base point $B_1$ is measured by the distance meter 41 of the video tachymeter 11, this distance meter 41 being arranged coaxial to the axis of the video camera 6, wherein the video camera 6 is oriented in such a way that the image $B'_{21}$ of the base point $B_1$ lies on the optical axis (target axis $ZA_1$) in the principal point $H'_1$ of the video camera and, moreover, contains the image $B'_2$ of the second base point $B_2$. The oblique distance $e_{11}$ is the distance between the coordinate origin OP and the base point $B_1$. The vertical angle $\zeta_{B1}$ relative to the first base point $B_1$ with respect to the X-Y plane is measured at the same time that the axis $ZA_1$ of the video camera is adjusted, wherein the vertex of this angle lies in the tilting axis KA in point OP.

The video tachymeter 11 then swivels about a horizontal angle $\psi$ formed by the two base points $B_1$ and $B_2$ and the standing axis StA and this angle is measured, wherein the vertex of this angle is located in the standing axis StA in the coordinate origin OP.

During the subsequent sighting of a second base point $B_2$, the recording and storage of a second target image $M'_2$ and the measurement of the oblique distance $e_{22}$ to this second base point $B_2$ with the distance meter 41 of the video tachymeter, wherein the video camera 6 is aligned in such a way that the image $B'_2$ of the base point $B_2$ is located on the optical axis in the principal point $H'_2$ of the video camera, it is ensured that the image $B'_{12}$ of the first base point $B_1$ is contained in the target image $M'_2$. The oblique distance $e_{22}$ is the distance between the coordinate origin OP and the base point $B_2$. The measurement of the vertical angle $\zeta_{B2}$ to the second base point $B_2$ with respect to the X-Y plane is carried out together with the adjustment of the axis $ZA_2$ of the video camera, wherein the vertex of this angle lies in the tilting axis KA in the coordinate origin OP.

Figure 8:
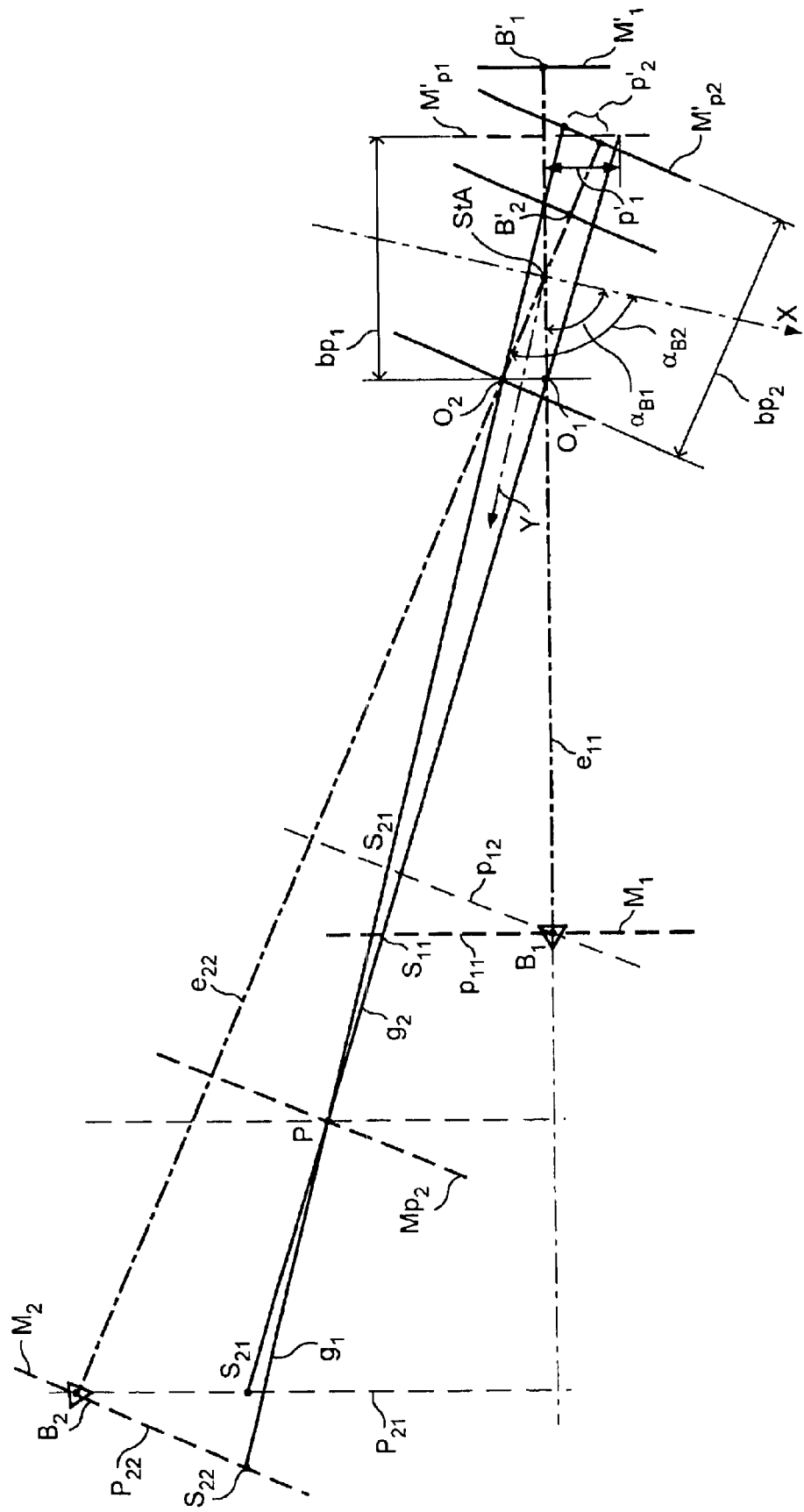
FIG. 8 shows the geometric relationships in the sighting of two base points and the determination of the coordinates of an object point at short sighting distances.

After the two target images $M'_1$ and $M'_2$ are recorded and stored, the coordinates of optional object points $P_i$ located in space and mapped in the recorded target images are determined by means of the coordinates of the two base points $B_1$ and $B_2$, wherein an object point P is selected for purposes of illustration with reference to FIG. 8. The marking of the searched object point P can either be carried out during recording in the respective present video image or in the recorded and stored target images by means of clicking on a mouse. The target image coordinates $q'_{i1}$; $q'_{i2}$; $h'_{i1}$; $h'_{i2}$ of the object point P are determined in each target image $M'_1$ and $M'_2$ based on these recorded video images or target images $M'_1$ and $M'_2$. A conversion of the target image coordinates $q'_{i1}$; $q'_{i2}$; $h'_{i1}$; $h'_{i2}$ of object point P which lie in the plane of the CCD matrix 9 of the video camera is carried out by means of the measured oblique distances $e_{11}$ and $e_{22}$, corrected by the device constants $\Delta e$, the measured target image coordinates $q'_{i1}$; $q'_{i2}$; $h'_{i1}$; $h'_{i2}$ and the focal length f of the objective of the video camera, wherein indexes 1 and 2 are used when there are two base points $B_1$ and $B_2$.

By means of the image coordinates $q'_{i1}$; $q'_{i2}$; $h'_{i1}$; $h'_{i2}$, the measured oblique distances $e_{11}$ and $e_{22}$, the horizontal angle $\psi$ measured with the angle measuring system of the video tachymeter, the vertical angles $\zeta_{B1}$ and $\zeta_{B2}$ which are likewise measured by angle measuring systems of the video tachymeter, and lengths $e_{12}$ and $e_{21}$ (FIG. 8) derived from the horizontal angle $\psi$, oblique distances $e_{11}$ and $e_{22}$, and vertical angles $\zeta_{B1}$ and $\zeta_{B2}$, the parameters $q_{11}$; $q_{12}$; $h_{11}$; $h_{12}$; $h_{21}$; $q_{21}$; $h_{22}$; $q_{22}$ of support points $S_{11}$; $S_{12}$; $S_{21}$; $S_{22}$ located in the object space are calculated and the coordinates of these support points are then calculated therefrom according to the following equations:

$x_{S11} = e_{11} \cos \zeta_{B1} \cos \alpha_{B1} - q_{11} \cos \alpha_{B1} + h_{11} \sin \zeta_{B1} \sin \alpha_{B1}$ $y_{S11} = e_{11} \cos \zeta_{B1} \sin \alpha_{B1} + q_{11} \sin \alpha_{B1} - h_{11} \sin \zeta_{B1} \cos \alpha_{B1}$ $z_{S11} = e_{11} \sin \zeta_{B1} + h_{11} \cos \zeta_{B1}$ $x_{S12} = e_{22} \cos \zeta_{B1} \cos \psi \cos \alpha_{B1} - q_{12} \cos \alpha_{B1} + h_{12} \sin \zeta_{B1} \sin \alpha_{B1}$ $y_{S12} = e_{22} \cos \zeta_{B2} \cos \psi \sin \alpha_{B1} + q_{12} \sin \alpha_{B1} - h_{12} \sin \zeta_{B1} \cos \alpha_{B1}$ $z_{S12} = e_{22} \cos \zeta_{B2} \cos \psi \sin \zeta_{B1} + h_{12} \cos \zeta_{B1}$ $x_{S21} = e_{11} \cos \zeta_{B1} \cos \psi \cos \zeta_{B2} + q_{22} \cos \alpha_{B1} - h_{22} \sin \zeta_{B2} \sin \alpha_{B2}$ $y_{S21} = e_{11} \cos \zeta_{B1} \cos \psi \sin \zeta_{B2} + q_{22} \sin \alpha_{B2} + h_{22} \zeta_{B2} \cos \alpha_{B2}$ $z_{S21} = e_{11} \cos \zeta_{B1} \cos \psi \sin \zeta_{B1} - h_{22} \cos \zeta_{B2}$ $x_{S22} = e_{22} \cos \zeta_{B2} \cos \alpha_{B2} + q_{22} \cos \alpha_{B2} - h_{22} \sin \zeta_{B2} \sin \alpha_{B2}$ $y_{S22} = e_{22} \cos \zeta_{B2} \sin \zeta_{B2} + q_{22} \sin \alpha_{B2} + h_{22} \sin \zeta_{B2} \cos \alpha_{B2}$ $z_{S22} = e_{22} \cos \zeta_{B1} - h_{22} \cos \zeta_{B2}$ In these formulas, the angles $\alpha_{B1}$ and $\alpha_{B2}$ are angles lying in the horizontal plane which are enclosed by the X axis and the oblique distances $e_{11}$ and $e_{22}$ projected in the horizontal plane, where $\psi = \alpha_{B2} - \alpha_{B1}$, and which are measured by the angle measuring systems of the video tachymeter.

These coordinates are coordinates of the four support points $S_{11}$; $S_{12}$; $S_{21}$; $S_{22}$ of the coordinate system with the coordinate origin OP in the intersection of the standing axis StA and tilting axis KA. According to known mathematical laws, the equation of a straight line $g_1$ can be calculated from the coordinates for the support points $S_{11}$ and $S_{22}$ and the equation of a straight line $g_2$ can be calculated from the coordinates for support points $S_{12}$ and $S_{21}$. The intersection of these two straight lines $g_1$ and $g_2$ is the object point P whose coordinates were to be determined.

The coordinates of other object points mapped and/or marked on the target images $M_1$ and $M_2$ can be determined in the same way.

Figure 9:
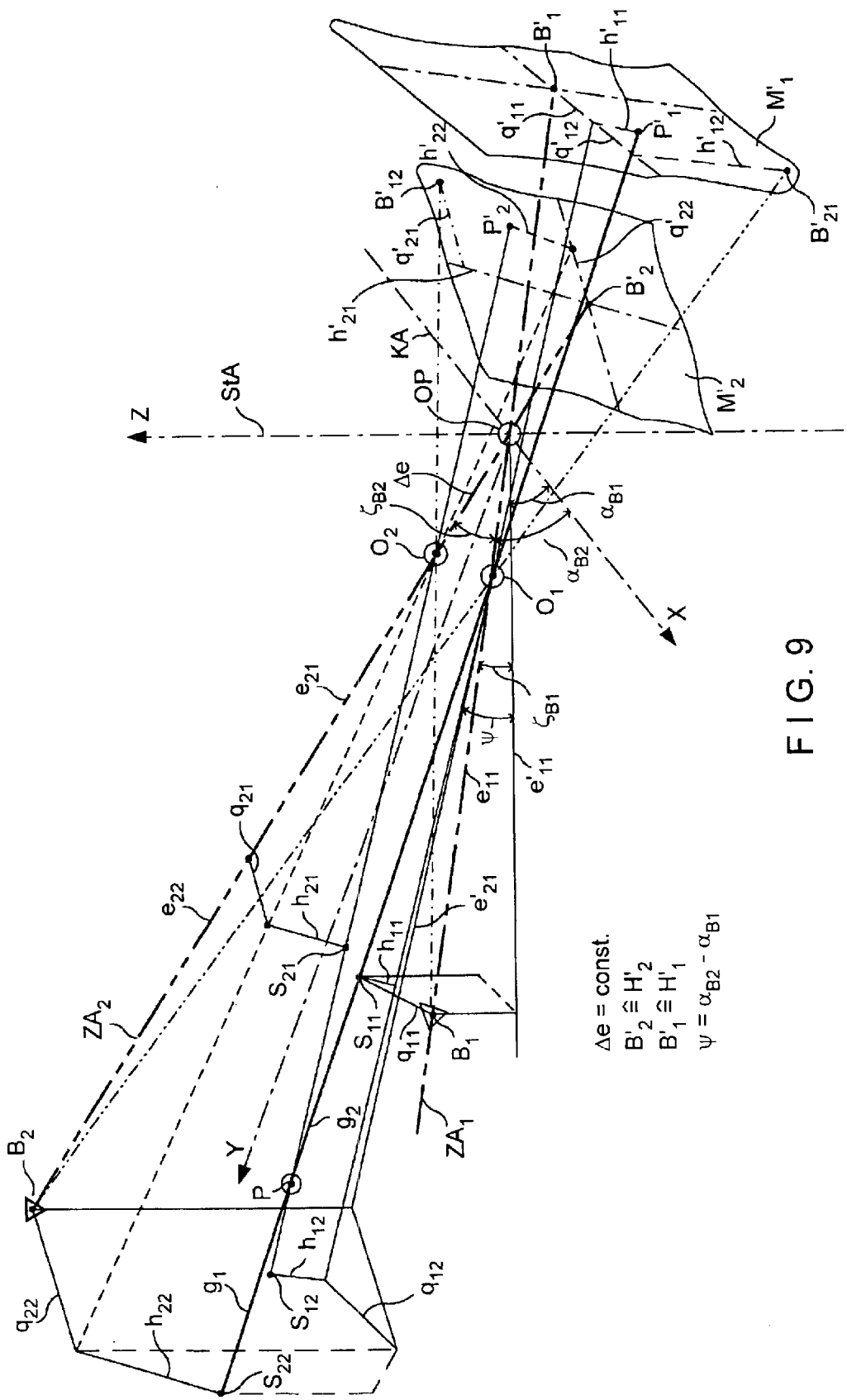
FIG. 9 is a schematic illustration of the determination of the spatial coordinates x; y and z of an object point $P_i$ with reference to a tachymeter stand point.
Figure 10:
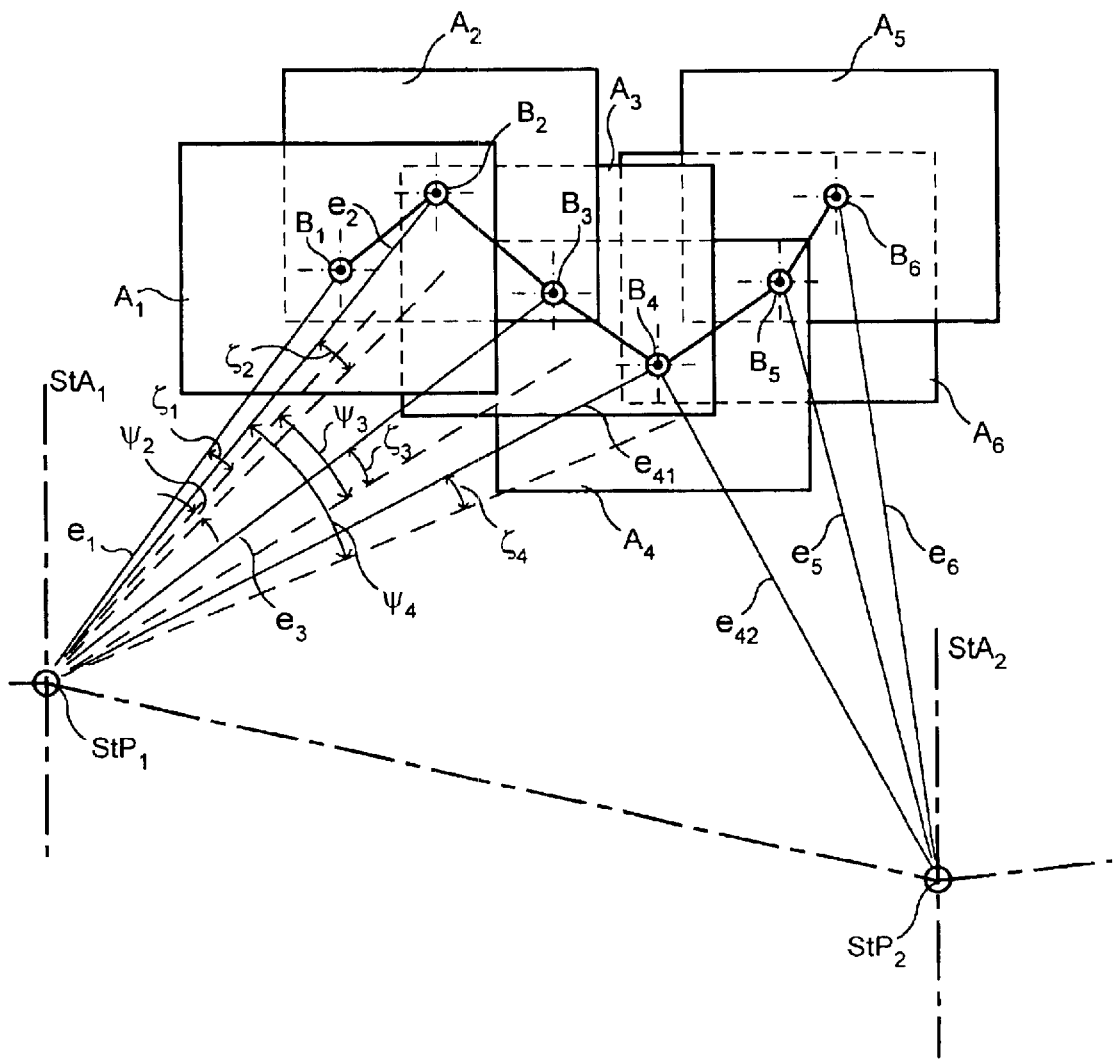
FIG. 10 shows a video traverse for surveying rows of object points.

FIG. 10 shows a video image polygon composed of target images $A_i$ (i=1 to 6) with a recorded traverse from base points $B_i$ (i=1 to 6) which were recorded by the camera of the video tachymeter from two different tachymeter stand points $StP_1$ and $StP_2$. A video tachymeter is arranged at these tachymeter stand points, whose coordinates are known, or a video tachymeter is positioned successively in these tachymeter stand points. Accordingly, starting from the one video tachymeter stationed at the first tachymeter stand point $StP_1$, target images with at least two base points are recorded by the video camera and stored in the computer, wherein one of the at least two base points (e.g., point $B_2$ or $B_3$ in FIG. 9) lies on two adjacent target images. As will be seen from FIG. 9, $B_1$ and $B_2$ lie on target images $A_1$ and $A_2$; $B_2$ lies on target images $A_1$, $A_2$ and $A_3$; $B_3$ lies on target images $A_2$, $A_3$ and $A_4$; $B_4$ lies on target images $A_3$, $A_4$ and $A_6$; $B_5$ lies on target images $A_4$, $A_5$ and $A_6$; and $B_6$ lies on target images $A_5$ and $A_6$, wherein target images $A_4$, $A_5$ and $A_6$ are produced proceeding from tachymeter stand point $StP_2$.

As will further be seen from FIG. 9, base point $B_4$ exists on target image $A_4$, which is recorded from tachymeter stand point $StP_1$, as well as on target image $A_4$ which was recorded from tachymeter stand point $StP_2$, so that a continuous continuation of the traverse composed of base points $B_i$ (i=1 to 6) is ensured.

To continue the traverse of target images (not shown), target images with at least two base points are produced proceeding from additional tachymeter stand points $StP_3$ to $StP_n$, at least one common base point being present on two adjacent target images. In this way, a traverse of video images started at tachymeter stand point $StP_1$ is continued proceeding from the second tachymeter stand point $StP_2$.

During the recording of the target images $A_i$, the corresponding coordinates or quantities, distance $e_i$ from the corresponding tachymeter stand point $StP_i$ to the individual base points $B_i$, the horizontal angle $\psi_i$ and the vertical angle $\zeta_i$ relative to the base points $B_i$ are determined with the distance meters and angle meters present in the video tachymeter. The coordinates of object points $P_i$ can then be determined from these determined parameters and other quantities derived and obtained from the target images in the way mentioned in connection with FIG. 8.

While the foregoing description and drawings represent the preferred embodiments of the present invention, it will be obvious to those skilled in the art that various changes and modifications may be made therein without departing from the true spirit and scope of the present invention.

What is claimed is:

1. A method for determining the spatial coordinates of one or more object points $P_i$ from the coordinates of at least two base points which serve as reference points and which do not lie in a plane by a video tachymeter which is arranged at a recording stand point, is swivelable about a vertical axis StA and comprises a distance measuring arrangement, a video camera with CCD matrix, a sighting device and angle measuring devices, wherein the video camera is tiltable about a horizontal axis, said method comprising the steps of:

marking the base points $B_1$ and $B_2$ in the terrain and sighting them by the sighting device;

measuring their coordinates by the distance measuring arrangement and angle measuring devices;

recording target images $M'_1$ and $M'_2$ each containing the marked base points $B_1$ and $B_2$ and the object points $P_i$ by the video camera and storing said target images; and determining the three-dimensional coordinates of the object points $P_i$ from their image point coordinates in the recorded target images $M'_1$ and $M'_2$ and from the base points $B_1$ and $B_2$ which are marked and determined by tachymetry.

2. The method according to claim 1, wherein the marking of the base points which are determined by tachymetry is carried out in the recorded target images.

3. The method according to claim 1, wherein the selection of object points $P_i$ to be measured at the target point is carried out on a target image which is transmitted to a screen provided at that location or is carried out subsequently during home processing with the aid of recorded and stored target images.

4. A method for determining the spatial coordinates of at least one object point $P_i$ from the coordinates of at least two base points which serve as reference points and which are determined by a video tachymeter which is arranged at a recording stand point, is swivelable about a vertical standing axis StA, and provided with a receptacle for a distance measuring arrangement, said receptacle being tiltable about a horizontal tilting axis KA, with a video camera with CCD matrix, with a sighting device and with angle measuring devices, comprising the following method steps:

sighting of at least two base points $B_1$ and $B_2$ located in the object space through the video tachymeter which is arranged at a recording stand point and is rotatable about the standing axis StA by a horizontal angle $\psi$, this video tachymeter having a video camera that is tiltable about the horizontal tilting axis KA by vertical angle $\zeta$, and determining the oblique distances $e_{11}$ and $e_{22}$ to the at least two base points $B_1$ and $B_2$ by means of the distance measuring arrangement of the video tachymeter;

producing two target images containing the at least two base points $B_1$ and $B_2$ and storing of the same, wherein the video camera is oriented in such a way that the image $B'_1$; $B'_2$ of the respective sighted base point $B_1$ and $B_2$ lies in the respective principal point $H'_1$ and $H'_2$ of the objective of the video camera; and the x-, y- and z-coordinates of at least one object point $P_i$ being located in the space encompassed by the target images and marked during the recording or marked on the recorded target images by means of the target image coordinates $q'_{i1}$; $q'_{i2}$; $h'_{i1}$; $h'_{i2}$ of the selected object point $P_i$ imaged on the CCD matrix and located in the object space, which target image coordinates $q'_{i1}$; $q'_{i2}$; $h'_{i1}$; $h'_{i2}$ measured in the target images are determined from the oblique distances $e_{11}$ and $e_{22}$, from the measured horizontal angle $\psi$, from the vertical angles $\zeta_1$ and $\zeta_2$, from a device constant $\Delta e$, and from the focal length f of the objective of the video camera, wherein these coordinates x, y, z are coordinates of a coordinate system with axes X; Y; Z with their coordinate origin lying at the intersection of the tilting axis and standing axis StA of the video tachymeter, and the standing axis StA extends vertical to the X-Y plane and determines the direction of the Z-axis.

5. The method according to claim 4, comprising the following method steps:

a. sighting a first base point $B_1$ by adjusting the axis of the video camera at a first horizontal angle $\psi_1$ and at a first vertical angle $\zeta_1$ relative to the X-Y plane in the direction of the first base point $B_1$ and measuring the first vertical angle $\zeta_1$ and the first horizontal angle $\psi_1$, wherein the vertex of this vertical angle $\zeta_1$ and of the horizontal angle $\psi_1$ lies in the tilting axis KA of the video tachymeter; recording and storing a first target image and measuring the oblique distance $e_{11}$ to this first base point $B_1$ with a distance measuring arrangement arranged coaxial to the axis of the video camera of the video tachymeter, wherein the video camera is oriented in such a way that the image $B'_1$ of the first base point $B_1$ lies in the principal point $H'_1$ of the objective of the video camera and, further, contains the image $B'_2$ of the second base point $B_2$;

b. swiveling the video tachymeter about a horizontal angle $\psi$ formed by the two base points $B_1$ and $B_2$ and the standing axis StA of the video tachymeter, wherein the vertex of this angle is located on the standing axis StA;

c. sighting a second base point $B_2$ by adjusting the axis of the video camera at a second horizontal angle $\psi_2$ and at a second vertical angle $\zeta_2$ relative to the X-Y plane in direction of the second base point $B_2$ and measuring the second vertical angle $\zeta_2$ and second horizontal angle $\psi_2$, wherein the vertex of the second horizontal angle $\psi_2$ lies in the tilting axis KA of the tachymeter, recording and storing a second target image and measuring the oblique distance $e_{22}$ to this second base point $B_2$ with the distance measuring arrangement of the video tachymeter, wherein the video camera is oriented in such a way that the image $B'_2$ of the second base point $B_2$ lies in the principal point $H'_2$ of the objective of the video camera and, further, contains the image $B'_1$ of the first base point $B_1$;

d. determining the coordinates of any object points $P_i$ contained in the recorded target images and located in the space by means of the coordinates of the first and second base point $B_1$ and $B_2$ by da. marking the searched object point $P_i$ during recording in the present video image or marking the searched object point $P_i$ in the recorded video images by means of clicking on a mouse;

db. measuring the target image coordinates $q'_{i1}$; $q'_{i2}$; $h'_{i1}$; $h'_{i2}$ of the object point $P_i$ in the recorded target images $(M'_1, M'_2)$;

dc. converting the target image coordinates $q'_{i1}$; $q'_{i2}$; $h'_{i1}$; $h'_{i2}$ of the object point $P_i$ which lie in the plane of the CCD matrix into analog coordinates $q_{i1}$; $q_{i2}$ and $h_{i1}$; $h_{i2}$ located in the object space by means of the measured oblique distances $e_{11}$ and $e_{22}$, corrected by the device constant $\Delta e$, the measured image coordinates $q'_{i1}$; $q'_{i2}$ and $h'_{i1}$; $h'_{i2}$, the focal length f of the objective of the video camera, where i=a function of the quantity of object points;

dd. calculating parameters $q_{11}$; $q_{12}$; $h_{11}$; $h_{12}$; $h_{21}$; $q_{21}$; $h_{22}$; $q_{22}$ of support points $S_{11}$; $S_{12}$; $S_{21}$; $S_{22}$ defining straight lines $g_1$ and $g_2$ by means of the image coordinates $q_{i1}$; $q_{i2}$; $h_{i1}$; $h_{i2}$ converted in the object space, the measured oblique distances $e_{11}$ and $e_{22}$, the measured horizontal angle $\psi$, the measured vertical angles $\zeta_1$ and $\zeta_2$, and the distances $e_{12}$ and $e_{21}$ which are derived from the horizontal angle $\psi$, from the oblique distances $e_{11}$ and $e_{22}$ and from the vertical angles $\zeta_1$ and $\zeta_2$, de. transforming these support point parameters into the coordinates of the coordinate system X; Y; Z with its origin at the intersection of the standing axis StA and tilting axis KA, e. calculating the coordinates x; y; and z of the object point $P_i$ with the coordinate origin of said coordinate system which in the intersection of the tilting axis KA and standing axis StA of the video tachymeter by means of the coordinates of the support points $S_{11}$; $S_{12}$; $S_{21}$; $S_{22}$ by determining the intersection of the straight lines $g_1$ and $g_2$ determined by these support point $S_{11}$; $S_{12}$ and $S_{21}$; $S_{22}$.

6. The method according to claim 4, wherein a traverse comprising object points $P_i$ is determined or fixed proceeding from a first tachymeter stand point by base points, this traverse being continued proceeding from a second stand point of the tachymeter.

7. The method according to claim 6, wherein, starting from a first tachymeter stand point, target images $M'_1$ and $M'_2$ with at least two base points $B_i$ are recorded by the video camera and stored in a computer, wherein one of the two base points is mapped on two adjacent target images; in that, starting from subsequent adjacent second to nth tachymeter stand points, target images with at least two base points $B_i$ are recorded, wherein a common base point is mapped on two adjacent target images, such that at least one identical base point is mapped on two adjacent target images which were recorded from two adjacent tachymeter stand points; and in that the coordinates of object points $P_i$ mapped on the target images are determined by means of the coordinates of the base points $B_i$.

8. The method according to claim 1, wherein an image evaluating device controls an autofocus system in such a way that the target image coordinates of the desired object point $P_i$ are measured in a focused position of the CCD matrix belonging to an object plane, where the base points $B_1$ and $B_2$ whose images $B'_1$ and $B'_2$ lie in the target image planes $M'_1$; $M'_2$ are sighted.

9. An arrangement for determining the spatial coordinates of at least one object point comprising:

at the measurement stand point, an electronic tachymeter with an automatic sighting device and a transmitter;

said electronic tachymeter being swivelable about a vertical axis (StA);

a distance measuring arrangement which is tiltable about a tilting axis KA;

a video camera with a CCD matrix;

a sighting device and angle measuring devices for measuring horizontal and vertical angle; and at the target point, a sighting rod with reflector;

a radio device;

a receiver; and a graphic field book with storage components;

at least a portion of the beam path of the distance measuring arrangement being arranged coaxial to the optical axis of the video camera;

a tube being provided for focusing the CCD matrix of the video camera, said tube being controllable depending on the distance measured by the distance measuring arrangement or adjustable manually in direction of the optical axis according to the sharpness or contrast of the video image; and an image processing system being provided for detecting object points and their specifying as object points with a determined position.

10. The arrangement according to claim 9, wherein the displacement of the tube with the CCD matrix in direction of the optical axis is realizable by a drive unit which is controlled by computer according to an algorithm.

11. The arrangement according to claim 10, wherein the respective displacement path of the tube with the CCD matrix is calculated by the computer corresponding to the distances from the respective sighted base point B that are determined by the distance measuring arrangement.

12. The arrangement according to claim 10, wherein the displacement path is derived during the focusing of the CCD matrix from the object point plane $P'_i$ located between the target image planes of the base points $B_1$ and $B_2$ by an image transformation according to maximum contrast or maximum sharpness.

13. The arrangement according to claim 9, wherein the sighting rod located at the target point comprises a receiver, a radio device and a computer with an additional target image screen, and wherein a transmission of the target image recorded at the measurement point is provided between the measurement stand point and the target point.

* * * * *